F. R. PARKER.
HIGH POTENTIAL ELECTRICITY ARRESTER.
APPLICATION FILED JULY 29, 1908. RENEWED JULY 12, 1915.

1,179,380.  Patented Apr. 11, 1916.

WITNESSES:
R. G. Parker
Nellie Parker

INVENTOR:
Frederick R. Parker.

UNITED STATES PATENT OFFICE.

FREDERICK R. PARKER, OF CHICAGO, ILLINOIS.

HIGH-POTENTIAL ELECTRICITY-ARRESTER.

1,179,380.     Specification of Letters Patent.     Patented Apr. 11, 1916.

Application filed July 29, 1908, Serial No. 445,960. Renewed July 12, 1915. Serial No. 39,518.

*To all whom it may concern:*

Be it known that I, FREDERICK R. PARKER, a citizen of the United States of America, residing at Chicago, in the county of Cook and State of Illinois, have invented a new and useful High-Potential Electricity-Arrester, of which the following is a specification, reference being had to the accompanying drawings illustrating same.

My invention relates to high-potential electricity arresters or lightning arresters.

The principal objects of my invention are to provide improved electrodes for high-potential electricity arresters; to provide an improved dielectric for such arresters; to provide such an arrester in which the ordinary dust or particles of disintegration, in arresters having disintegrable electrodes, is done away with, and at the same time provide high-conductive active surfaces for the electrodes; to provide metallic active surfaces for the electrodes but insufficient metal to become fused into points or protruding masses on the electrodes, upon an abnormally large discharge or a continued arc in the arrester; to provide electrodes for such arresters which have the advantages of all-metal electrodes on small discharges and the advantages of carbon electrodes on large discharges or continued arcs; to provide an improved spring arrangement for holding the electrodes of a high-potential electricity arrester in place; and to provide improved means for connecting circuit conductors with the arrester.

Other objects will be apparent from the following specification.

Figure 2:
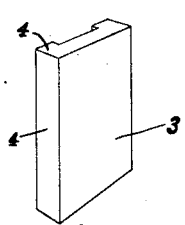
Figure 1:
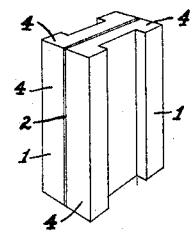
Figure 3:
Figure 5:
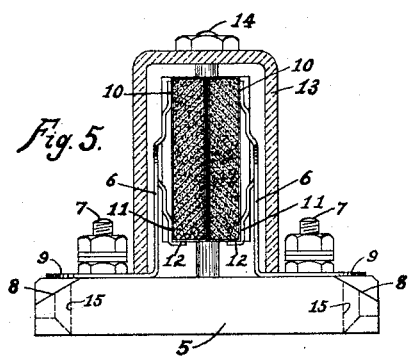
Figure 6:
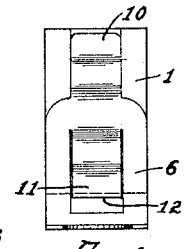
Figure 4:
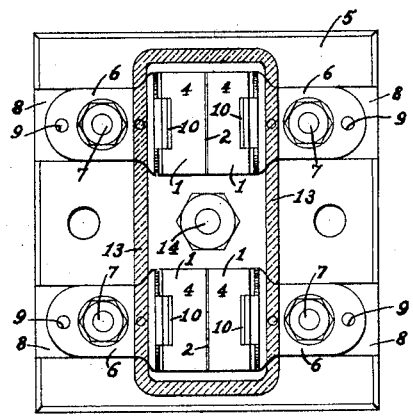

In the accompanying drawings Figure 1 is a perspective view of a pair of electrodes for a high-potential electricity arrester, and an interposed dielectric, having the improvements of the present invention; Fig. 2 is a perspective view of one of the improved electrodes of the arrester shown in Fig. 1; Fig. 3 is a side elevation of one form of the improved dielectric used in the arrester shown in Fig. 1; Fig. 4 is a plan view of the assembled arrester of the present invention, suitably equipped to accommodate a metallic line, the cover being shown in cross-section; Fig. 5 is an end elevation of the arrester shown in Fig. 4, with portions shown in cross-section; and Fig. 6 is a side elevation of one of the electrodes and its holding spring.

Like characters refer to like parts in the several figures.

It is well known that in high-potential electricity arresters or lightning arresters, where electrodes of disintegrable material are used, such as carbon electrodes, the dust and small particles worn or broken from the electrodes is a constant source of trouble, such dust and particles causing leakages through the arresters and therefore necessitating continual cleaning.

In the arrester of my present invention I coat the electrodes of disintegrable material, such as carbon or graphite, or other suitable material, with a thin metallic coating and thus prevent dust or particles from wearing or breaking off of the electrodes during their use. This metallic coating is preferably applied to the electrodes in the form of an electroplating, but may be applied in some other manner, either to just the active surfaces of the electrodes or entirely over the electrodes, the latter being preferred. It will readily be seen that such a metallic coating on the surface of an electrode of disintegrable material provides an active surface of very high conductivity and also prevents the disintegration of the electrode. This metallic coating also provides high-conductive contact surfaces for the engaging spring members, and also high-conductive paths from the engaging spring members to the dielectric. Thus although my improved electrodes provide high-conductive paths for the electricity to be arrested, they do not provide enough metal on the active surfaces thereof to cause the electrodes to freeze together or present large points or protruding masses of metal on the active surfaces thereof, from an excessive discharge through the arrester, as do electrodes composed entirely of metal.

I wish it to be understood that the metallic coating on my improved electrodes may comprise various metals or alloys, such as copper or alloys thereof, zinc or alloys thereof, tin or alloys thereof, aluminum, silver, or various other metals or alloys. To produce electrodes with active surfaces of very high conductivity I preferably employ either copper or silver for the coating. To provide an arrester in which the vapor caused by the passage of an arc therethrough tends to stop the passage of the arc, by such vapor being of high resistance or a nonconductor of electricity, I preferably employ zinc or some alloy or compound thereof.

In the arrester of this invention an abnormally large discharge of electricity therethrough, or a continued arc therethrough, may burn off the metallic plating at some portions of the active surfaces of the electrodes, but upon the secession of such an abnormal discharge or arc the electrodes will not be closer together at the point where the abnormal discharge or arc took place, than at other points. Thus it will be seen that the arrester will remain in serviceable condition for a number of abnormally large discharges or arcs therethrough, without being cleaned or dressed down on the active surfaces, which is not the case with electrodes composed entirely of metal. Upon slight discharges through the arrester the metallic plating or coating of the electrodes will not be burned away and hence the disintegrable material of the electrodes will not be exposed. Therefore, under this condition there will be no dust or particles broken off of the electrodes to form a leakage or a short-circuit through the arrester as is generally the case with carbon electrodes having no metallic protection on their active surfaces.

I am aware that various nonconducting adhesive substances have been applied to the active surfaces of electrodes for the purpose of preventing dust from the electrodes from forming in the arrester, but where such material is employed sufficiently thick to prevent dust or particles from breaking or wearing off of the electrodes, such nonconducting material greatly increases the potential necessary to arc through the arrester with a given thickness of interposed dielectric. This is not the case with the metallically coated electrodes of my present invention. Then again such nonconducting material on the electrodes presents active surfaces of poor conductivity, while my metallic coating presents active surface of very high conductivity.

I wish it to be understood that this invention also includes electrodes having a body of nonconducting material, such as wood, lava, porcelain, glass, or various nonconductors of electricity, or a body of high-resistance material, such as various mixtures of graphite, coated in any suitable manner with a thin metallic or conductive coating. These various materials are advantageous under various conditions.

The dielectric of my present invention comprises a piece of glass cloth, that is, a thin strip of material made or woven from thin shreds of glass. Such a dielectric has several advantages over dielectrics heretofore used: First, the shreds of glass provide a large number of very small holes in the dielectric, which holes break up or scatter the discharge of electricity through the arrester and thereby weaken the effect of the discharge at any one spot. Second, upon a continued arc through the arrester the shreds of glass are readily softened by the heat of the arc and thereby allow the electrodes to come together and thus stop the arc and the consequent heating thereof. Third, the glass in addition to being an exceedingly good insulator is also absolutely noninflammable, which is not the case with any softenable dielectric heretofore used. The advantages of such a dielectric can therefore be readily seen.

In the drawings 1 1 represent the electrodes of the improved arrester, and 2 represents the improved dielectric. In making this dielectric, if the glass shreds of the small sheet tend to separate or get out of place they may be suitably held in place by a suitable binding material or cement applied around the edges of the dielectric.

The metallic coating or plating on the electrodes covers the active surface 3 of each electrode and preferably covers the entire electrode. If it is desired to prevent a short-circuit or a leakage being formed on the exterior of the arrester by dust or foreign particles settling thereon, the edge surfaces 4 4 of the electrodes may be coated with a suitable insulating material.

On the base portion 5, which is preferably made of porcelain, are mounted spring members 6 6, by suitable binding screws or bolts 7 7. Underneath the lower ends of the spring members 6 6 the base portion 5 is recessed as at 8 8 to allow the circuit conductors to be readily soldered through holes 9 9 in the ends of the spring members 6 6, if desired. Extending through the base 5 under the lower ends of the spring members 6 6, are holes 15 15, to accommodate conductors leading from the underneath side of the base 5 to the spring members 6 6 or binding screws 7 7. This arrangement provides good facilities for connecting the circuit conductors to either the binding screws 7 7, or the springs 6 6 by solder, leading from either the top, sides or bottom of the base 5. The bottom of the base 5 may be grooved as desired to accommodate the circuit conductors. In connecting the arrester of Fig. 4 for use, the spring members 6 6 or binding posts 7 7 on one side of the base 5 are connected to the respective conductors of a metallic circuit, the springs 6 6 or posts 7 7 on the other side of base 5 being connected together and to ground. Of course there are other connections which may be employed.

Each spring member 6 is preferably formed as shown in Figs. 5 and 6, with two tongue portions 10 and 11 thereon adapted to bear against an electrode 1 as shown in Fig. 5. The lower end of each tongue portion 11 is preferably formed inwardly to provide a stop 12 to limit the insertion of the electrodes 1 1 between the spring members 6 6. This formation of the spring members 6 6 firmly holds the electrodes together, due to the two points of bearing 10 and 11 on each electrode, near the ends thereof.

I preferably provide a suitable cover 13 for the electrodes 1 1, which may be of glass or any suitable material, and hold the cover 13 in place by a suitable bolt 14.

I do not wish to be limited in this invention to all of the exact details of construction herein shown, as many modifications of the several parts of the invention may be made or utilized without departing from the scope of the appended claims.

I wish it to be understood that the several features of this invention, such as the improved electrodes, the improved dielectric, the improved spring members, and the other improvements of construction, may be used either singly or collectively. I also wish it to be understood that the improvements of this invention may be used in various forms and constructions of arresters, or protective or electrical apparatus.

What I claim as my invention is:

1. A dielectric member for a high-potential electricity arrester comprising a piece of glass cloth.

2. A dielectric member for a high-potential electricity arrester comprising noninflammable heat-susceptible material provided with many small holes therethrough.

3. A dielectric member for a high-potential electricity arrester comprising a plurality of shreds of glass.

4. A dielectric member for a high-potential electricity arrester comprising a plurality of shreds of noninflammable heat-susceptible material.

5. A high-potential electricity arrester comprising electrodes having a thin metallic coating on the active surfaces thereof, and a piece of glass cloth interposed between the electrodes.

6. The combination with a high-potential electricity arrester having electrodes, of a flexible spring for holding an electrode in place, said spring having a pair of free tongue portions thereon bearing against the electrode near the opposite ends thereof.

7. The combination with a high-potential electricity arrester having electrodes, of flexible springs for holding the electrodes in place, each spring having a pair of free tongue portions thereon adapted to bear against an electrode near the opposite ends thereof, one tongue portion on each spring being formed as a stop to limit the insertion of the electrodes into the apparatus.

8. A high-potential electricity arrester comprising a plurality of electrodes and glass cloth interposed between the electrodes.

9. A high-potential electricity arrester comprising a plurality of electrodes and noninflammable heat-susceptible material provided with many small holes therethrough interposed between the electrodes.

10. A high-potential electricity arrester comprising a plurality of electrodes and a plurality of shreds of glass interposed between the electrodes.

11. A high-potential electricity arrester comprising a plurality of electrodes and a plurality of shreds of noninflammable heat-susceptible material interposed between the electrodes.

12. The combination with a high-potential electricity arrester having an electrode, of a flexible spring for holding the electrode in place, said spring having a pair of free tongue portions adapted to bear separately against the electrode.

13. The combination with a high-potential electricity arrester having an electrode, of a flexible spring for holding the electrode in place, said spring having a pair of free tongue portions adapted to bear separately against the electrode, and a stop on one of the said tongue portions to limit the movement of the electrode when being put in place.

14. A dielectric member for a high-potential electricity arrester, comprising noninflammable heat-susceptible material having a plurality of openings therethrough.

15. A high-potential electricity arrester comprising a plurality of electrodes, and a dielectric member comprising noninflammable heat-susceptible material having a plurality of openings therethrough, interposed between the electrodes.

16. The combination with a grooved electrode of the character set forth, of spring mechanism having a plurality of free-ended separately acting finger portions fitting in the said groove for purposes substantially as set forth.

17. The combination with a grooved electrode of the character described, of spring mechanism having a plurality of separately acting finger portions adapted to fit in the said groove, one of the said finger portions having a stop thereon for determining the position of the electrode, for purposes substantially as set forth.

18. The combination with an electrode of the character set forth, of flexible finger-supporting mechanism having a plurality of free-ended separately-acting fingers bearing against the electrode.

19. The combination with an electrode of the character set forth, of flexible finger-supporting mechanism having a plurality of free-ended separately-acting fingers bearing against the electrode, at least one of the said fingers having a stop thereon for the electrode.

20. A spring support of the character set forth, having a flexible finger-supporting portion and a plurality of separately-acting fingers projecting therefrom.

21. A spring support of the character set forth, having a flexible finger-supporting portion and a plurality of separately-acting fingers projecting therefrom, at least one of the said fingers having a stop thereon.

22. The combination with an electrode of the character set forth, of spring mechanism having a flexible finger-supporting portion and a plurality of separately-acting fingers projecting therefrom and bearing against the said electrode.

23. The combination with an electrode of the character set forth, of spring mechanism having a flexible finger-supporting portion and a plurality of separately-acting fingers projecting therefrom and bearing against the said electrode, at least one of the said fingers having a stop thereon for the electrode.

24. The combination with a high-potential electricity arrester having electrodes, of a flexible spring for holding an electrode in place, said spring having a pair of free tongue portions thereon bearing against the electrode near the opposite ends thereof, one of the said tongue portions having a stop thereon for the electrode.

25. A glass dielectric member for a high-potential electricity arrester, having a plurality of openings therethrough.

26. A high-potential electricity arrester comprising a plurality of electrodes, and a glass dielectric member having a plurality of openings therethrough, interposed between the electrodes.

27. A high-potential electricity arrester comprising electrodes having a thin metallic coating on the active surfaces thereof, and a glass dielectric member having a plurality of openings therethrough, interposed between the electrodes.

28. A high-potential electricity arrester comprising electrodes having a thin metallic coating on the active surfaces thereof, and a plurality of shreds of glass interposed between the electrodes.

29. A high-potential electricity arrester comprising electrodes having a thin metallic coating on the active surfaces thereof, and a dielectric member provided with many small holes therethrough interposed between the electrodes.

30. In a high-potential electricity arrester having electrode members, at least one of which is a disintegrable electrode, a dielectric member having cavities in its walls, interposed between said electrodes, a thin coating of conducting material adjacent the discharge surface of the disintegrable electrode and separating such surface from the cavities in the dielectric element.

31. A high-potential electricity arrester comprising suitable electrodes and an interposed dielectric member of glass.

32. A high-potential electricity arrester comprising suitable electrodes and an interposed dielectric, the latter comprising a member of soft glass.

33. A high-potential electricity arrester comprising suitable electrodes and an interposed dielectric of non-inflammable heat-softenable material.

34. In a high-potential electricity arrester having electrode members, at least one of which is a disintegrable electrode, a dielectric member having one or more cavities therein and interposed between the said electrodes, and a thin covering of conducting material adjacent the discharge surface of the disintegrable electrode and separating such surface from the cavity or cavities in the dielectric member.

35. In a high-potential electricity arrester having electrodes at least one of which is a disintegrable electrode, a dielectric member having one or more openings therein and interposed between the said electrodes, and a thin portion of conducting material between the dielectric member and the said disintegrable electrode and covering the discharge surface of the latter.

36. A dielectric member for a high-potential electricity arrester, comprising noninflammable heat-susceptible material having provision for permitting the discharge of electricity therethrough through air.

37. A high-potential electricity arrester comprising a plurality of electrodes, and a dielectric member of noninflammable heat-susceptible material having provision for permitting the discharge of electricity therethrough through air interposed between the electrodes.

38. The combination with an electrical protective device, of supporting mechanism therefor comprising a free-ended finger-supporting portion and a plurality of finger portions arranged longitudinally thereof and carried by the said free-ended portion, the said finger portions coöperating with the finger-supporting portion and with the protective device for holding the latter in place.

As inventor of the foregoing I hereunto subscribe my name this 25th day of July, 1908.

FREDERICK R. PARKER.

Witnesses:
R. G. PARKER,
NELLIE PARKER.